July 18, 1933.  A. G. HILLMAN  1,919,020
OPTICAL SYSTEMS FOR CAMERAS FOR PHOTOGRAPHY
OR CINEMATOGRAPHY PARTICULARLY IN COLOR
Filed May 29, 1931   3 Sheets-Sheet 1

July 18, 1933.  A. G. HILLMAN  1,919,020
OPTICAL SYSTEMS FOR CAMERAS FOR PHOTOGRAPHY
OR CINEMATOGRAPHY PARTICULARLY IN COLOR
Filed May 29, 1931   3 Sheets-Sheet 3

INVENTOR
Albert Geo. Hillman
BY
Nathan, Bowman + Helfrich
ATTORNEY

Patented July 18, 1933

1,919,020

UNITED STATES PATENT OFFICE

ALBERT GEORGE HILLMAN, OF LONDON, ENGLAND, ASSIGNOR TO COLOURGRAVURE LIMITED, OF LONDON, ENGLAND

OPTICAL SYSTEMS FOR CAMERAS FOR PHOTOGRAPHY OR CINEMATOGRAPHY PARTICULARLY IN COLOR

Application filed May 29, 1931. Serial No. 540,851.

This invention relates to improvements in optical systems for cameras for photography or cinematography particularly color photography or cinematography.

The invention deals with optical combinations of the kind which include a light dividing system to divide a main beam of light into sections so as to form multiple similar images by simultaneous exposure, one such system being described in my co-pending application Serial No. 541,001, filed May 29, 1931, comprising a pair of intersecting reflectors which are so shaped and positioned as to divide the main beam of light transmitted by an objective in such proportions that the image receiving plates are evenly illuminated.

Such systems call for accurate setting of the reflecting elements with respect to one another and to the objective and optical axis, and an aim of the present invention is to provide an improved method of mounting the optical combination and improved means for making the necessary multiple adjustments to determine the correct position of the elements of the combination whereby the combination may be adjusted and set on the optical bench with the highest degree of accuracy and thereafter embodied as a completely assembled and finished unit in a camera suited therefor.

According to the present invention there is provided as a unit the combination of an objective and an optical light-dividing multiple image-forming system mounted on a panel or frame with means for pre-adjusting the elements of the light-dividing system relatively to one another and to the objective and optical axis.

The means for pre-adjusting the combination on the panel conveniently include provision for rotating the individual reflector elements of the light dividing system to determine the angle of reflection therefrom and provision for rotating the light dividing system bodily, on the one hand about one axis to bring it in correct relationship with the optical axis, and on the other hand about the optical axis itself to regulate the separation between the light-dividing system and the objective.

In order that the invention may be the more readily understood reference is hereinafter made to the accompanying drawings in which:—

Figs. 4 and 5 are detail views hereinafter referred to.

Figure 1:
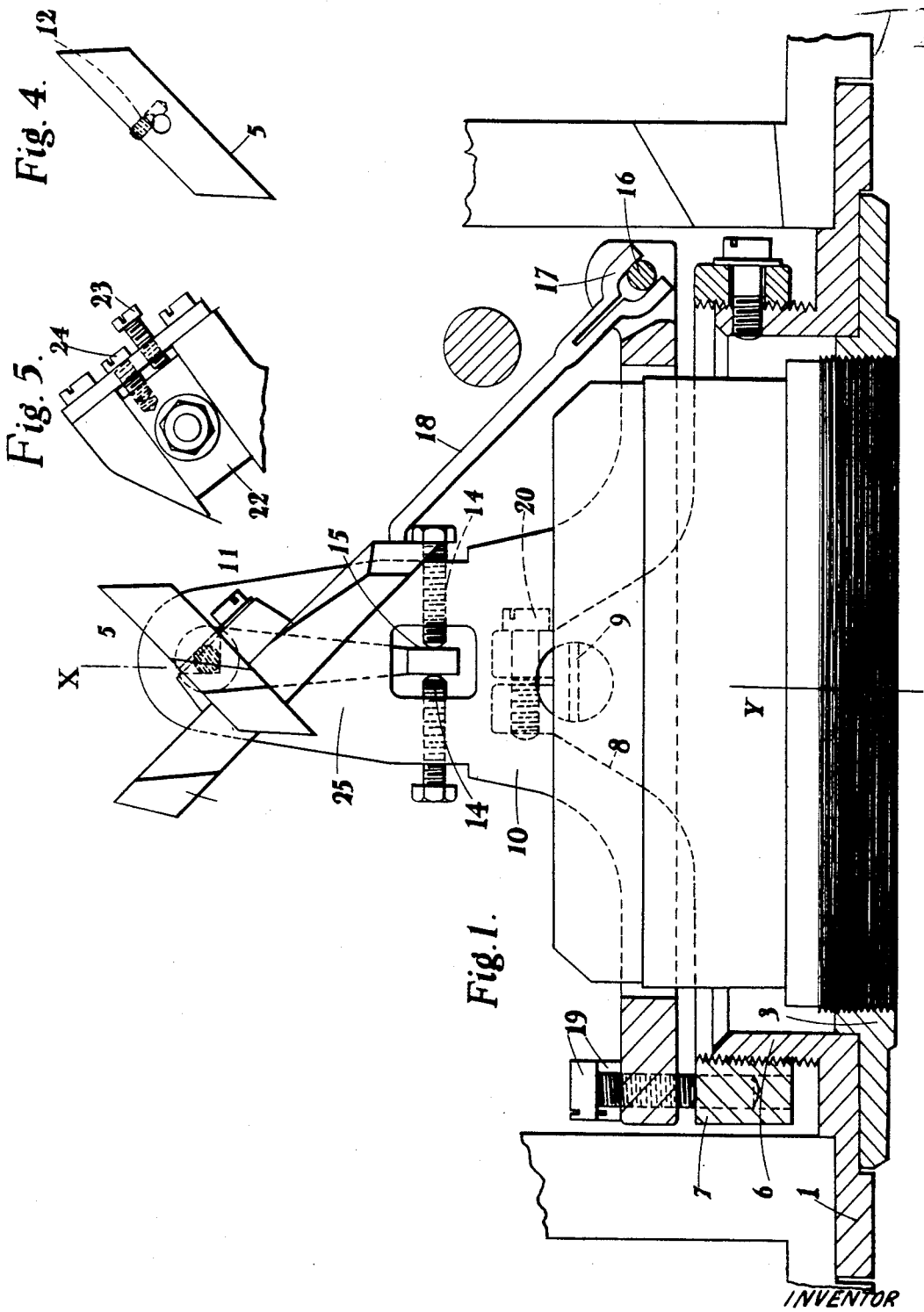
Fig. 1 is a plan view of the complete unit and Fig. 2 a front elevation of a part thereof.
Figure 2:
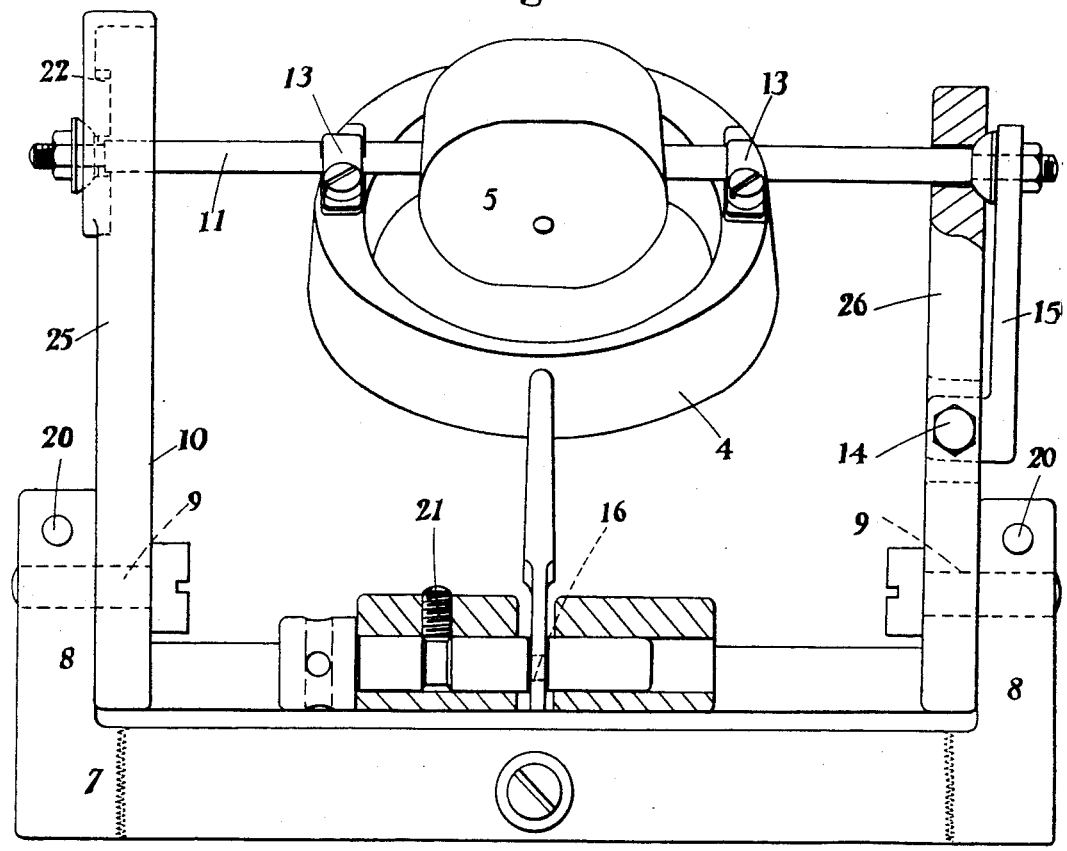
Figure 3:
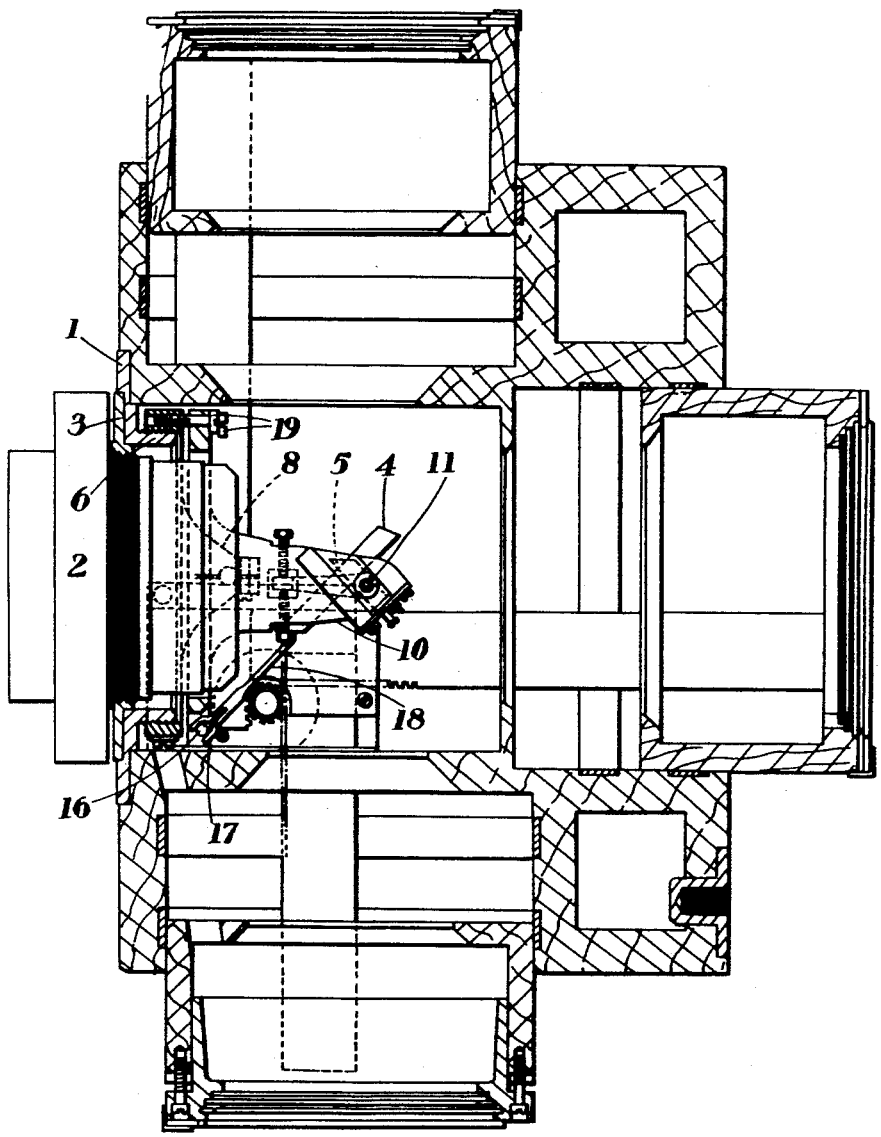
Fig. 3 is a plan view of a camera showing the unit assembled therein.

Referring to the drawings 1 is a panel on which the optical combination is mounted. The optical combination illustrated consists of an objective 2 (see Fig. 3), which screws into an internally threaded ring 3 secured to the panel, and a light dividing system in the form of a pair of reflectors 4, 5 which divide the main beam of light transmitted by the objective into two reflected beams and two direct beams, the direct beams, which combine to form one image in three color work, being produced by the rays which pass outside the outer contour of the ring reflector 4 on the one hand and the rays which pass through the annular space formed by the inner contour of the ring reflector 4 and the periphery of the disc reflector 5 on the other hand.

The panel 1 is provided with a threaded boss 6 to which is screwed an internally threaded ring 7 having projecting arms or brackets 8, 8 to which is pivoted at 9, 9 a frame 10. Journaled in the frame 10 is a spindle 11 carrying the reflectors 4, 5 of the light-dividing system. The reflector 5 is keyed to the spindle by the screw 12 as shown in Fig. 4, and the reflector 4 is journaled to the spindle 11 at 13, 13 so as to be rotatable thereabout.

To regulate the angle of reflection of the reflector 5, the spindle 11 carrying the reflector is permitted to be rotated the desired amount by careful adjustment of the setscrews 14, 14 which act on opposite faces of a radial arm 15 on the spindle.

Rotation of the mirror 4 about the spindle 11 to regulate its angle of reflection is effected by the rotary movement of a trunnioned crank or eccentric 16 which engages a forked end 17 of a rod 18 connected to the reflector.

The setting when made is locked by the screw 21.

Adjustment to bring the reflectors in their correct position on the optical axis X—Y is by way of the pivoted frame 10, the rocking movement of which about the axes 9, 9 is effected by appropriate adjustment of the push and pull screws 19, 19. 20, 20 are locking screws.

The separation of the light-dividing system from the lens is regulated by screwing or unscrewing the frame-carrying ring 7 about the screwed boss 6 on the panel.

Provision is made for bringing the spindle 11 into a truly vertical position normal to the optical axis. For this purpose each end of the spindle is related to a slide-guided block 22 (see Fig. 5) actuated by push and pull screws 23, 24. These slide-guided blocks work in tracks in each end limb 25, 26 of the frame 10, the track in one limb being disposed in a direction perpendicular to the track in the other limb. The drawings show only one of the screw-adjusted slide-guided blocks. That at the other end of the spindle is similar to the one shown except that it works in a direction at right angles to the first one as above explained.

What I claim is:—

1. In connection with a camera for taking multiple images by simultaneous exposure, a unit comprising the combination of a support; an objective, and an optical light dividing system consisting of a pair of reflectors, mounted thereon; means on said support for rotating said reflectors relatively to one another about a common axis to adjust and set the reflectors for a desired angle of reflection; and means on said support for adjusting the light dividing system with respect to the objective and to the optical axis; said unit being insertable into the camera body so that the optical combination may be accurately pre-adjusted away from the camera and inserted in the camera in its pre-adjusted condition.

2. In connection with a camera for taking multiple images by simultaneous exposure, a unit comprising the combination of a support; an objective and an optical light dividing system mounted thereon; said support comprising a rocking frame and means for rotating said rocking frame to adjust and set the light dividing system carried thereby relatively to the optical axis; and means on said support for adjusting the elements of the light dividing system relatively to one another and to the objective; said unit being insertable into the camera body so that the optical combination may be accurately pre-adjusted away from the camera and inserted in the camera in its pre-adjusted condition.

3. In connection with a camera for taking multiple images by simultaneous exposure, a unit comprising the combination of a support, an optical light dividing system mounted on a spindle carried thereby; an objective; and means on said support for adjusting the elements of the light dividing system relatively to one another and to the objective and to the optical axis; said means comprising an adjusting device for said spindle to bring it into a position normal to the optical axis; said unit being insertable into the camera body so that the optical combination may be accurately pre-adjusted away from the camera and inserted in the camera in its pre-adjusted condition.

4. In connection with a camera for taking multiple images by simultaneous exposure, a unit comprising the combination of a support; a rocking frame carried thereby; an optical light dividing system consisting of a pair of mirrors mounted on a spindle carried by said rocking frame; an objective; means on said rocking frame for rotating said mirrors relatively to one another to adjust and set them for a desired angle of reflection; means for rotating said rocking frame to regulate the setting of the light dividing system with respect to the optical axis; means for adjusting said spindle to bring it into a position normal to the optical axis; and means for regulating the separation between the objective and the light dividing system; said unit being insertable into the camera body so that the optical combination may be accurately pre-adjusted away from the camera and inserted in the camera in its pre-adjusted condition.

5. In connection with a camera for taking multiple images by simultaneous exposure, a unit comprising the combination of a support; an objective and an optical light dividing system mounted thereon; said support comprising a rocking frame; pull and push set screws for rotating said frame to regulate the setting of the light dividing system with respect to the optical axis; and means on said support for adjusting the elements of the light dividing system relatively to one another and to the objective; said unit being insertable into the camera body so that the optical combination may be accurately pre-adjusted away from the camera and inserted in the camera in its pre-adjusted condition.

6. A camera unit as claimed in claim 3, in which the spindle is secured to a slide guided member adapted to be moved to and fro by set screws.

7. A camera unit as claimed in claim 1 wherein one of the reflectors is secured to a spindle; said spindle having an arm; and regulating set screws engaging opposite sides of said arm to set the reflector in a desired angularly adjusted position.

8. A camera unit as claimed in claim 1, having a spindle carried by the support; a reflector rotatably mounted on said spindle; eccentric means for rotating said mirror to the desired angular position thereof;

and means for locking the reflector in the adjusted position.

9. In connection with a camera for taking multiple images by simultaneous exposure, an optical light-dividing system consisting of a pair of mirrors; a rocking frame; a spindle mounted on said frame; said mirrors being mounted on said spindle; means for rotating said mirrors relatively to one another to adjust and set them for a desired angle of reflection; means for rotating said rocking frame to regulate the setting of the light dividing system with respect to the optical axis; means for adjusting said spindle to bring it into a position normal to the optical axis; and means for regulating the separation between the objective and the light dividing system.

10. In connection with a camera for taking multiple images by simultaneous exposure, a unit comprising the combination of a support, an optical light dividing system and an objective mounted on said support; said objective being positioned behind said light dividing system; said light dividing system comprising relatively movable elements; means for adjusting said elements relatively to one another; means for adjusting said light divider as a whole with respect to the optical axis; means for retaining the adjustable parts in fixed adjusted position; and means for adjusting the separation between said objective and said light dividing system; said unit being insertable into the camera body so that the optical combination may be accurately pre-adjusted away from the camera and inserted in the camera in its pre-adjusted condition.

ALBERT GEORGE HILLMAN.